(12) United States Patent
Yoo et al.

(10) Patent No.: US 9,181,425 B2
(45) Date of Patent: Nov. 10, 2015

(54) THERMOPLASTIC RESIN COMPOSITION HAVING EXCELLENT FLAME RETARDANCY, COLORING PROPERTIES AND SCRATCH RESISTANCE

(75) Inventors: Je Sun Yoo, Pohang-si (KR); Ki Young Nam, Yeosu-si (KR); Yong Yeon Hwang, Daejeon (KR); Min Sul Jang, Yeosu-si (KR); Jae Young Sim, Yeosu-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/824,176

(22) PCT Filed: Mar. 31, 2011

(86) PCT No.: PCT/KR2011/002204
§ 371 (c)(1),
(2), (4) Date: Mar. 15, 2013

(87) PCT Pub. No.: WO2012/036360
PCT Pub. Date: Mar. 22, 2012

(65) Prior Publication Data
US 2013/0178564 A1    Jul. 11, 2013

(30) Foreign Application Priority Data
Sep. 17, 2010   (KR) .......... 10-2010-0091353

(51) Int. Cl.
| | | |
|---|---|---|
| *C08L 55/02* | (2006.01) | |
| *C08L 25/12* | (2006.01) | |
| *C08L 33/22* | (2006.01) | |
| *C08K 3/22* | (2006.01) | |
| *C08K 5/02* | (2006.01) | |
| *C08L 33/20* | (2006.01) | |
| *C08K 5/3492* | (2006.01) | |
| *C08K 9/00* | (2006.01) | |
| *C08L 63/00* | (2006.01) | |

(52) U.S. Cl.
CPC ............ *C08L 33/20* (2013.01); *C08L 25/12* (2013.01); *C08L 55/02* (2013.01); *C08K 3/2279* (2013.01); *C08K 5/34924* (2013.01); *C08K 9/00* (2013.01); *C08L 63/00* (2013.01)

(58) Field of Classification Search
CPC ......... C08L 55/02; C08L 25/12; C08L 33/22; C08K 3/2279; C08K 5/02
USPC ............................................ 524/101
See application file for complete search history.

(56) References Cited

U.S. PATENT DOCUMENTS

| | | | | |
|---|---|---|---|---|
| 4,731,198 | A * | 3/1988 | Watanabe et al. ............. | 516/91 |
| 5,182,048 | A * | 1/1993 | Kintz et al. ............. | 252/363.5 |
| 7,629,402 | B2 | 12/2009 | Ryu et al. | |
| 7,897,138 | B2 | 3/2011 | Koshi | |
| 2008/0038187 | A1* | 2/2008 | Koshi et al. ................. | 423/617 |
| 2010/0069540 | A1 | 3/2010 | Yoo et al. | |

FOREIGN PATENT DOCUMENTS

| | | | |
|---|---|---|---|
| CN | 101676328 A | | 3/2010 |
| JP | 2006-144185 | | 6/2006 |
| KR | 10-2003-0056039 | * | 12/2001 |
| KR | 100364626 B1 | | 2/2002 |
| KR | 10-2003-0056039 | * | 7/2003 |
| KR | 10-2007-0053250 | | 5/2007 |
| KR | 10-2007-0064924 | | 6/2007 |
| KR | 10-0875958 | | 12/2008 |
| KR | 10-2009-0058785 | | 6/2009 |
| KR | 10-2009-0073620 | | 7/2009 |

OTHER PUBLICATIONS

KR10-2003-0056039 A—Cheil Industries Inc.—Jul. 4, 2003—Min Young Jeong—machine translation.*
"Functional Fibers", Zeng Hanming, p. 560, Chemical Industry Press.
"Nano Flame Retardant", Jia Xiuwei, p. 195, Chemical Industry Press.
Flame-retardant Polymer Materials, Yuxiang, Ou et al., pp. 188, 192-193, Jan. 31, 2001, National Defense Industry Press (in Chinese).

* cited by examiner

*Primary Examiner* — Ling Choi
*Assistant Examiner* — Ronald Grinsted
(74) *Attorney, Agent, or Firm* — Dentons US LLP

(57) ABSTRACT

Disclosed is a thermoplastic resin composition comprising A) 100 parts by weight of a basic resin comprising 11 to 89% by weight of an acrylonitrile-butadiene-styrene copolymer and 89 to 11% by weight of a styrene-acrylonitrile copolymer, B) 10 to 40 parts by weight of a bromine organic flame retardant, and C) 0.1 to 10 parts by weight of a coated antimony compound.

6 Claims, No Drawings

THERMOPLASTIC RESIN COMPOSITION HAVING EXCELLENT FLAME RETARDANCY, COLORING PROPERTIES AND SCRATCH RESISTANCE

This application is a National Stage Entry of International Application No. PCT/KR2011/002204, filed Mar. 31, 2011, and claims the benefit of Korean Application No. 10-2010-0091353, filed on Sep. 17, 2010, all of which are hereby incorporated by reference in their entirety for all purposes as if fully set forth herein.

BACKGROUND OF THE INVENTION

1. Field of the Invention

The present invention relates to a thermoplastic resin composition with superior flame retardancy, colorability and scratch resistance. More particularly, the present invention relates to a thermoplastic resin composition which exhibits flame retardancy, impact strength, scratch resistance, colorability and surface hardness based on a synergistic effect through incorporation of a bromine organic flame retardant and a coated antimony compound in a resin containing an acrylonitrile-butadiene-styrene copolymer.

2. Description of the Related Art

In general, an acrylonitrile-butadiene-styrene (hereinafter, referred to as ABS) resin is widely used as exterior materials of electric/electrical products and office machines and the like due to stiffness and chemical resistance of acrylonitrile, and processability and mechanical strength of butadiene and styrene. However, the ABS resin is inherently combustible and is vulnerable to fire.

Due to these problems, the ABS resin used for electric/electrical products, office machines and the like should satisfy flame-retardancy standards in order to secure safety against flames. Methods for imparting flame retardancy to ABS resins include polymerization of rubber-modified styrene resins through incorporation of flame retardant monomers, mixing a flame retardant and a flame retardant aid with the prepared rubber-modified styrene resin and the like.

The flame retardants may be classified into halogen flame retardants and non-halogen flame retardants. The non-halogen flame retardants should be added at a relatively greater amount due to considerably low flame retardancy efficiency, as compared to halogen flame retardants, thus causing deterioration in mechanical and physical properties of rubber-modified styrene-based resins.

Accordingly, the most general method for imparting flame retardancy to an ABS resin is to use a halogen flame retardant. The halogen flame retardant is effective in improving flame retardancy, while maintaining mechanical and physical properties of a rubber-modified styrene resin. In particular, a bromine flame retardant is particularly effective. However, the ABS resin to which flame retardancy is imparted has considerably low scratch resistance due to inherent butadiene rubber characteristics of the ABS resin and ABS resin products with high gloss are disadvantageously readily scratched.

Meanwhile, a flame retardant aid does not exhibit complete flame resistance, but has improved flame resistance effects, when used in conjunction with a flame retardant, thus advantageously reducing a content of the flame retardant. Generally, in a case in which a halogen flame retardant is used, use of an antimony compound as a flame retardant aid is particularly effective.

However, when a flame retardant ABS resin is prepared from a conventional antimony trioxide compound, problems such as deterioration in physical properties, for example, impact strength and colorability of the resin occur. The antimony trioxide compound also has regulatory issues such as prohibition or restriction of use thereof due to risk and negative effects on the human body and environment. In addition, most flame retardant ABS resins have a scratch resistance, measured as pencil hardness, of 3B or 4B.

Accordingly, there is increasing demand for development of ABS resins which maintain superior scratch resistance, impact strength and flowability, and exhibit superior flame retardancy.

SUMMARY OF THE INVENTION

Therefore, the present invention has been made in view of the above problems, and it is an object of the present invention to provide a thermoplastic resin composition which exhibits flame retardancy, impact strength, scratch resistance, colorability and surface hardness, based on a synergistic effect through incorporation of a bromine organic flame retardant and a coated antimony compound in a resin containing an acrylonitrile-butadiene-styrene copolymer.

In accordance with an aspect of the present invention, the above and other objects can be accomplished by the provision of a thermoplastic resin composition comprising: A) 100 parts by weight of a basic resin comprising 10 to 89% by weight of an acrylonitrile-butadiene-styrene copolymer and 89 to 10% by weight of a styrene-acrylonitrile copolymer; B) 10 to 40 parts by weight of a bromine organic flame retardant; and C) 0.1 to 10 parts by weight of a coated antimony compound.

DETAILED DESCRIPTION OF THE INVENTION

Hereinafter, the present invention will be described in detail.

The thermoplastic resin composition with superior flame retardancy, colorability and scratch resistance according to the present invention comprises: A) 100 parts by weight of a basic resin comprising 11 to 89% by weight of an acrylonitrile-butadiene-styrene copolymer and 89 to 11% by weight of a styrene-acrylonitrile copolymer; B) 10 to 40 parts by weight of a bromine organic flame retardant; and C) 0.1 to 10 parts by weight of a coated antimony compound.

The acrylonitrile-butadiene-styrene copolymer may be prepared in the form of a powder by subjecting a butadiene rubber, an acrylonitrile monomer and a styrene monomer to emulsion graft polymerization, followed by aggregation, dehydration and drying. Preferably, the acrylonitrile-butadiene-styrene copolymer may be prepared in the form of a powder by continuously or simultaneously adding a monomer mixture consisting of 5 to 40 parts by weight of acrylonitrile and 20 to 65 parts by weight of styrene to a mixed solution consisting of 50 to 70 parts by weight of a butadiene rubber having a butadiene rubber having an average particle size of 0.1 to 0.5 micrometers (μm), 0.6 to 2 parts by weight of an emulsifying agent, 0.2 to 1 part by weight of a molecular weight modifier, and 0.05 to 0.5 parts by weight of a polymerization initiator, based on 100 parts by weight of the total content of the monomers and the butadiene copolymer, followed by aggregation in the presence of a 5% aqueous sulfuric acid solution, dehydration and drying.

When the content of the butadiene rubber is lower than 30% by weight, production efficiency is considerably deteriorated, when the content thereof exceeds 70% by weight, disadvantageously, a graft ratio is decreased and impact resistance and processability are considerably deteriorated. The content of the butadiene rubber is preferably 50 to 60% by weight.

The styrene-acrylonitrile copolymer has a weight average molecular weight of 50,000 to 150,000 and contains 20 to 40% by weight of an acrylonitrile monomer, and may be used alone or in combination of two or more types thereof.

The bromine organic flame retardant is preferably present in an amount of 10 to 40 parts by weight, based on 100 parts by weight of the basic resin. The thermoplastic resin composition prepared within this content range of the bromine organic flame retardant advantageously has superior heat resistance and weatherability without causing deterioration in mechanical strength and flowability.

Examples of bromine organic flame retardants that can be used in the present invention include, but are not limited to, hexabromocyclododecane, tetrabromocyclooctane, monochloropentabromocyclohexane, decabromodiphenyloxide, octabromodiphenyloxide, decabromodiphenylethane, ethylenebis(tetrabromophthalimide), tetrabromobisphenol A, a brominated epoxy oligomer, bis(tribromophenoxy)ethane, tris(tribromophenyl)cyanurate, tetrabromobisphenol A bis(allyl ether) and derivatives thereof. Use of tris(tribromophenyl)cyanurate or a brominated epoxy oligomer is most preferred.

The coated antimony compound considerably improves flame retardancy of the prepared thermoplastic resin composition through synergistic effects obtained when used in conjunction with a bromine organic flame retardant as a flame retardant aid. Examples of the antimony compound include antimony pentaoxide, metal antimony, antimony chloride and the like. Use of antimony pentaoxide is more preferred.

The coated antimony compound is preferably present in an amount of 0.1 to 10 parts by weight with respect to 100 parts of the basic resin. The thermoplastic resin composition prepared within this content range of the coated antimony compound advantageously exhibits superior flame retardancy without causing deterioration in impact strength.

Also, the coating may be preliminarily performed using an organic salt containing an amine or an inorganic salt. The amine-containing organic salt may be at least one selected from alkyl amine, ethoxylated aliphatic amine, monoethanolamine and an alkanolamine salt. Non-limiting examples of the amine-containing organic salt include, but are not limited to ethylamine, butylamine, ethoxylated stearyl amine, diethanolamine, triethanolamine, and an alkanolamine salt of triethylamine and diacid.

Also, examples of the inorganic salt include one or more of sodium hydroxide, calcium hydroxide, phosphoric acid, zinc chloride, sodium chloride, potassium chloride, ammonium chloride and sodium silicate.

The thermoplastic resin composition may further comprise at least one selected from the group consisting of an impact modifier, a lubricant, a heat stabilizer, an antidropping agent, an antioxidant, a photostabilizer, a UV blocker, a pigment and an inorganic filler as an additive.

Now, the present invention will be described in more detail with reference to the following Examples. These examples are only provided to illustrate the present invention and should not be construed as limiting the scope and spirit of the present invention.

Example 1

20 parts by weight of tris(tribromophenyl)cyanurate (SR245) as a bromine organic flame retardant, 2 parts by weight of antimony pentaoxide coated with ethoxylated aliphatic amine, monoethanolamine, 0.5 parts by weight of a lubricant, 0.5 parts by weight of an antioxidant, 0.1 parts by weight of an antidropping agent, and 3 parts by weight of a black coloring agent were added to 100 parts by weight of a base resin consisting of 25 parts by weight of an ABS copolymer (DP270, containing 55% by weight of a butadiene rubber, produced by LG Chem. Ltd.) prepared by emulsion graft polymerization from a butadiene rubber latex having an average particle size of 0.3 μm and 75 parts by weight of a styrene-acrylonitrile copolymer containing 25% by weight of acrylonitrile and having a weight average molecular weight of 120,000, the resulting mixture was homogeneously mixed using a Hansel mixer and a thermoplastic resin composition was prepared in the form of a pellet using a twin screw extruder.

The pellet-form thermoplastic resin composition was subjected to injection molding to produce specimens for physical property and flame retardancy testing.

Example 2

A thermoplastic resin composition was prepared in the same manner as in Example 1, except that 25 parts by weight of a brominated epoxy flame retardant (BEO) as a bromine organic flame retardant was used in Example 1.

Example 3

A thermoplastic resin composition was prepared in the same manner as in Example 1, except that the flame retardant aid was coated with sodium hydroxide, instead of the organic salt in Example 1.

Comparative Example 1

A thermoplastic resin composition was prepared in the same manner as in Example 1, except that an ABS copolymer containing 45% by weight of a butadiene rubber was used in the same content as in Example 1.

Comparative Example 2

A thermoplastic resin composition was prepared in the same manner as in Example 2, except that an ABS copolymer containing 45% by weight of a butadiene rubber was used in the same content as in Example 2.

Comparative Example 3

A thermoplastic resin composition was prepared in the same manner as in Example 1, except that 30 parts by weight of an ABS copolymer containing 45% by weight of a butadiene rubber, and 70 parts by weight of SAN were used in order to provide a uniform total rubber content (% by weight) in Example 1.

Comparative Example 4

A thermoplastic resin composition was prepared in the same manner as in Example 2, except that 30 parts by weight of an ABS copolymer containing 45% by weight of a butadiene rubber, and 70 parts by weight of SAN were used in order to provide a uniform total rubber content (% by weight) in Example 2.

The substances used for Examples 1 to 3 and Comparative Examples 1 to 4 are summarized in the following Table 1.

TABLE 1

|  | Examples | | | Comparative Examples | | | |
| --- | --- | --- | --- | --- | --- | --- | --- |
| Items | 1 | 2 | 3 | 1 | 2 | 3 | 4 |
| BD-55 ABS | 25 | 25 | 25 | — | — | — | — |
| BD-45 ABS | — | — | — | 25 | 25 | 30 | 30 |
| SAN | 75 | 75 | 75 | 75 | 75 | 70 | 70 |
| SR245 | 25 | — | 25 | 25 | — | 25 | — |
| BEO | — | 25 | — | — | 25 | — | 25 |
| Coated $Sb_2O_5$ | 2 (organic-coated) | 2 (organic coated) | 2 (inorganic coated) | 2 | 2 | 2 | 2 |
| Coloring agent | 3 | 3 | 3 | 3 | 3 | 3 | 3 |

Test Example 1

The properties of the thermoplastic resin composition samples prepared in Examples 1 to 3 and Comparative Examples 1 to 4 were measured according to the following method and the results thus obtained are shown in the following Table 2.
  Impact strength (Notched izod impact strength): measured in accordance with ASTM D-256 using ⅛ specimens.
  Pencil hardness: measured in accordance with ASTM D-3365.
  Colorability: coloring level with respect to 3 parts by weight of a black coloring agent using a color meter (SUGA Color Computer) was measured and represented in values L, a and b. The value L represents brightness and becomes closer to pure black with increasing value.
  Flame resistance (Vertical flammability): measured in accordance with UL-94.

TABLE 2

|  | Examples | | | Comparative Examples | | | |
| --- | --- | --- | --- | --- | --- | --- | --- |
| Items | 1 | 2 | 3 | 1 | 2 | 3 | 4 |
| Impact strength | 17.7 | 15.1 | 15.2 | 12.7 | 10.9 | 16.1 | 13.6 |
| Pencil hardness | B | B | B | B | B | 2B | 2B |
| Colorability (L) | 22.43 | 22.78 | 22.42 | 22.56 | 22.98 | 23.21 | 23.24 |
| Flame resistance (1/10") | V-1 | V-1 | V-1 | V-1 | V-1 | V-1 | V-1 |

As can be seen from Table 2 above, the thermoplastic resin compositions (Examples 1, 2 and 3) comprising an ABS copolymer containing 55% by weight of a butadiene rubber, tris(tribromophenyl)cyanurate as a bromine organic flame retardant and coated antimony pentaoxide satisfied V-1 flame resistance and exhibited superior impact strength and pencil hardness (scratch resistance). Also, it can be seen that the thermoplastic resin compositions exhibited superior coloring effects and good appearance.

Meanwhile, when an ABS copolymer containing 45% by weight of a butadiene rubber was used in the same amount (Comparative Examples 1 and 2), pencil hardness, colorability and flame resistance were excellent, but impact strength was poor due to decrease in total rubber content.

Also, the thermoplastic resin compositions (Comparative Examples 3 and 4) prepared using an increased content, i.e., 30 parts by weight of an ABS copolymer containing 45% by weight of a butadiene rubber so that the total rubber content was the same as in Examples 1 and 2 exhibited a less decrease in impact strength, but exhibited considerably deterioration in pencil hardness and colorability.

As can be seen from the results, when an ABS copolymer containing 55% of a butadiene rubber was used, impact strength, pencil hardness and colorability were superior, as compared to when an ABS copolymer containing 45% of a butadiene rubber was used.

Comparative Example 5

A thermoplastic resin composition was prepared in the same manner as in Example 1, except that non-coated antimony trioxide was used, instead of the coated antimony pentaoxide in Example 1.

Comparative Example 6

A thermoplastic resin composition was prepared in the same manner as in Example 1, except that non-coated antimony pentaoxide was used, instead of the coated antimony pentaoxide in Example 1.

Comparative Example 7

A thermoplastic resin composition was prepared in the same manner as in Example 2, except that non-coated antimony trioxide was used, instead of the coated antimony pentaoxide in Example 2.

Comparative Example 8

A thermoplastic resin composition was prepared in the same manner as in Example 2, except that non-coated antimony pentaoxide was used, instead of the coated antimony pentaoxide, in Example 2.

Comparative Example 9

A thermoplastic resin composition was prepared in the same manner as in Example 1, except that tetrabromobisphenol A (TBBA) was used as a flame retardant, instead of tris(tribromophenyl)cyanurate (SR245) in Example 1.

Comparative Example 10

A thermoplastic resin composition was prepared in the same manner as in Example 1, except that non-coated antimony pentaoxide was used, and an organic salt used for coating was separately added and participated in the reaction in Example 1.

Comparative Example 11

A thermoplastic resin composition was prepared in the same manner as in Example 3, except that non-coated antimony pentaoxide was used and sodium hydroxide used for coating was separately added and participated in the reaction in Example 3.

The substances used for Examples 1 to 3 and Comparative Examples 5 to 11 are summarized in the following Table 3.

TABLE 3

|  | Examples | | | Comparative Examples | | | | | | |
| --- | --- | --- | --- | --- | --- | --- | --- | --- | --- | --- |
| Items | 1 | 2 | 3 | 5 | 6 | 7 | 8 | 9 | 10 | 11 |
| BD-55 ABS | 25 | 25 | 25 | 25 | 25 | 25 | 25 | 25 | 25 | 25 |
| SAN | 75 | 75 | 75 | 75 | 75 | 75 | 75 | 75 | 75 | 75 |
| SR245 | 25 | — | 25 | 25 | 25 | — | — | — | 25 | 25 |

TABLE 3-continued

| | Examples | | | Comparative Examples | | | | | | |
|---|---|---|---|---|---|---|---|---|---|---|
| Items | 1 | 2 | 3 | 5 | 6 | 7 | 8 | 9 | 10 | 11 |
| BEO | — | 25 | — | — | — | 25 | 25 | — | — | — |
| TBBA | — | — | — | — | — | — | — | 25 | — | — |
| Non-coated $Sb_2O_5$ | — | — | — | — | 2 | — | 2 | — | 1.5 | 1.5 |
| Non-coated $Sb_2O_3$ | — | — | — | 2 | — | 2 | — | — | — | — |
| Coated $Sb_2O_3$ | 2 | 2 | 2 | — | — | — | — | — | — | — |
| Coated $Sb_2O_5$ | 2 | 2 | 3 | — | — | — | — | 2 | — | — |
| Coloring agent | 3 | 3 | 3 | 3 | 3 | 3 | 3 | 3 | 3 | 3 |

Test Example 2

The properties of thermoplastic resin composition specimens prepared in Examples 1 to 3 and Comparative Examples 5 to 11 in the same manner as in Test Example 1 above and the results thus obtained are shown in the following Table 4.

TABLE 4

| | Examples | | | Comparative Examples | | | | | | |
|---|---|---|---|---|---|---|---|---|---|---|
| Items | 1 | 2 | 3 | 5 | 6 | 7 | 8 | 9 | 10 | 11 |
| Impact strength | 17.7 | 15.1 | 15.2 | 14.2 | 9.7 | 14.4 | 7.8 | 16.2 | 10.1 | 9.2 |
| Pencil hardness | B | B | B | B | B | B | B | 2B | B | B |
| Colorability (L) | 22.43 | 22.78 | 22.42 | 24.11 | 22.65 | 24.51 | 23.01 | 23.25 | 22.56 | 22.62 |
| Flame resistance (1/10″) | V-1 | V-1 | V-1 | V-1 | V-1 | V-1 | V-1 | V-1 | V-1 | V-1 |

As can be seen from Table 4 above, the thermoplastic resin compositions (Examples 1, 2 and 3) comprising antimony pentaoxide coated with an organic salt or inorganic salt satisfied a V–1 flame resistance and exhibited superior impact strength and pencil hardness (scratch resistance). Also, the thermoplastic resin compositions exhibited superior coloring effects and thus had good appearance.

Meanwhile, the thermoplastic resin compositions (Comparative Examples 5 and 7) comprising non-coated antimony trioxide did not exhibit a great decrease in impact strength, but exhibited a considerable decrease in colorability due to inherent whiteness of antimony trioxide.

Also, the thermoplastic resin compositions (Comparative Examples 6 and 8) comprising antimony pentaoxide being not coated with an organic salt and having the same particle size exhibited superior colorability due to inherent transparency of antimony pentaoxide, but exhibited a considerably decrease in impact strength with a resin due to strong polarity of antimony pentaoxide. The thermoplastic resin composition (Comparative Example 8) using TBBA as a flame retardant, instead of SR245, exhibited a slight deterioration in pencil hardness due to inherent properties of the flame retardant.

Furthermore, when antimony pentaoxide not coated with organic salt/sodium hydroxide was separately added and reacted (Comparative Examples 10 and 11), colorability was minimally deteriorated, but similar decrease in impact strength was obtained as in when non-coated antimony pentaoxide was used.

As can be confirmed from the results, the thermoplastic resin compositions (Example 1, 2 and 3) according to the present invention exhibited superior physical properties by using an ABS copolymer containing an increased content of butadiene and maintained flame resistance and considerably superior impact strength and colorability by using coated antimony pentaoxide.

As apparent from the fore-going, the present invention provides a thermoplastic resin composition which exhibits superior flame retardancy, impact strength, scratch resistance, colorability providing excellent appearance design, and surface hardness, based on synergistic effects through incorporation of a bromine organic flame retardant and a coated antimony compound to a resin containing an ABS resin.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thermoplastic resin composition comprising:
    A) 100 parts by weight of a basic resin comprising 11 to 89% by weight of an acrylonitrile-butadiene-styrene copolymer and 89 to 11% by weight of a styrene-acrylonitrile copolymer;
    B) 10 to 40 parts by weight of a bromine organic flame retardant; and
    C) 0.1 to 10 parts by weight of a coated antimony pentaoxide compound,
    wherein the coated antimony pentaoxide compound is an antimony pentaoxide compound coated with: an amine-containing organic base of ethoxylated aliphatic amine; or at least one inorganic compound selected from the group consisting of sodium hydroxide, calcium hydroxide, phosphoric acid, zinc chloride, sodium chloride, potassium chloride and sodium silicate,
    wherein the acrylonitrile-butadiene-styrene copolymer comprises 50 to 60% by weight of a butadiene rubber, and
    wherein the thermoplastic resin composition does not contain an antimony trioxide compound.

2. The thermoplastic resin composition according to claim 1, wherein the styrene-acrylonitrile copolymer has a weight average molecular weight of 50,000 to 150,000 and comprises 20 to 40% by weight of an acrylonitrile monomer.

3. The thermoplastic resin composition according to claim 1, wherein the bromine organic flame retardant is selected from hexabromocyclododecane, tetrabromocyclooctane, monochloropentabromocyclohexane, decabromodiphenyloxide, octabromodiphenyloxide, decabromodiphenylethane, ethylenebis(tetrabromophthalimide), tetrabromobisphenol A, a brominated epoxy oligomer, bis(tribromophenoxy)ethane, tris(tribromophenyl)cyanurate, tetrabromobisphenol A bis(allyl ether) and derivatives thereof.

4. The thermoplastic resin composition according to claim 1, wherein the bromine organic flame retardant is tris(tribromophenyl)cyanurate or a brominated epoxy oligomer.

5. The thermoplastic resin composition according to claim 1, wherein the ethoxylated aliphatic amine is ethoxylated stearyl amine.

6. The thermoplastic resin composition according to claim 1, wherein the thermoplastic resin composition further comprises at least one selected from the group consisting of an impact modifier, a lubricant, a heat stabilizer, an antidropping agent, an antioxidant, a photostabilizer, a UV blocker, a pigment and an inorganic filler.

* * * * *